US011917389B2

(12) United States Patent
Huang et al.

(10) Patent No.: US 11,917,389 B2
(45) Date of Patent: Feb. 27, 2024

(54) MULTIFUNCTIONAL SOUNDING DEVICE

(71) Applicant: AAC Microtech (Changzhou) Co., Ltd., Changzhou (CN)

(72) Inventors: Xingzhi Huang, Shenzhen (CN); Yao Wang, Shenzhen (CN); Lubin Mao, Shenzhen (CN); Jie Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 139 days.

(21) Appl. No.: 17/826,191

(22) Filed: May 27, 2022

(65) Prior Publication Data

US 2023/0283958 A1 Sep. 7, 2023

(30) Foreign Application Priority Data

Mar. 2, 2022 (CN) ........................ 202220442639.5

(51) Int. Cl.
*H04R 9/06* (2006.01)
*H04R 9/02* (2006.01)
*H04R 7/04* (2006.01)
*H04R 9/04* (2006.01)

(52) U.S. Cl.
CPC ................ *H04R 9/06* (2013.01); *H04R 7/04* (2013.01); *H04R 9/025* (2013.01); *H04R 9/045* (2013.01); *H04R 2400/03* (2013.01)

(58) Field of Classification Search
CPC . H04R 9/06; H04R 7/04; H04R 9/025; H04R 9/045; H04R 2400/03
USPC ................................ 381/182, 335, 162, 396
See application file for complete search history.

(56) References Cited

U.S. PATENT DOCUMENTS

2005/0047621 A1 * 3/2005 Cranfill .................. B06B 1/045
381/396

* cited by examiner

*Primary Examiner* — Norman Yu
(74) *Attorney, Agent, or Firm* — W&G Law Group

(57) ABSTRACT

The present disclosure discloses a multifunctional sounding device including a frame, a vibrator assembly, and a speaker assembly. The frame includes a top wall and a bottom wall. The vibrator assembly includes a vibrating unit vibrating along a first direction. The speaker assembly includes two magnetic units locating on two opposite sides of the vibrating unit respectively, a diaphragm fixed to the top wall, and two voice coils. The diaphragm vibrates along a second direction that is perpendicular to the first direction. A winding axis of each voice coil is perpendicular to the first and second directions. The two magnetic units are sandwiched between the top wall and the bottom wall. A peripheral edge of the diaphragm is recessed inward for avoiding the two magnetic units. The multifunctional sounding device disclosed by the present disclosure combines functions of emitting sounds and providing vibrations.

7 Claims, 4 Drawing Sheets

MULTIFUNCTIONAL SOUNDING DEVICE

FIELD OF THE PRESENT DISCLOSURE

The present disclosure relates to electronic devices, in particular to a multifunctional sounding device.

DESCRIPTION OF RELATED ART

With developments of electronic technologies, portable electronic devices are becoming more and more popular, such as smart phones, handheld game players, palmtops, and so on. These electronic devices interact with users through emitting sounds and/or providing vibrations.

An electronic device in the related art has an individual speaker for emitting sounds and an individual vibrator for providing vibrations. Separate installations of the speaker and the vibrator cause a cumbersome manufacturing process. While, the speaker and the vibrator occupy a great many of interior spaces of the electronic device.

Thus, it is necessary to provide a novel multifunctional sounding device to solve the problem.

SUMMARY

An objective of the present disclosure is to provide a multifunctional sounding device which combines functions of emitting sounds and providing vibrations. When installing the multifunctional sounding device into an electronic device, the multifunctional sounding device simplifies separate installations of an individual speaker and an individual vibrator and occupies fewer interior spaces of the electronic device.

In order to achieve the objective mentioned above, the present disclosure discloses a multifunctional sounding device including a frame, a vibrator assembly, and a speaker assembly. The vibrator assembly and the speaker assembly are accommodated in the frame. The frame includes a top wall, a bottom wall opposite to and spaced apart from the top wall, and a side wall connecting the top wall and the bottom wall. The vibrator assembly includes a vibrating unit suspended in the frame and vibrating along a first direction. The speaker assembly includes two magnetic units, a diaphragm, and two voice coils. The two magnetic units are fixed to the frame and locate on two opposite sides of the vibrating unit respectively. Each magnetic unit includes a magnetic gap. The diaphragm is fixed to the top wall and vibrates along a second direction. The second direction is perpendicular to the first direction. The two voice coils locate in the magnetic gaps of the two magnetic units respectively and drive the diaphragm for vibrating and generating sounds. A winding axis of each voice coil is perpendicular to the first direction and the second direction. The two magnetic units are sandwiched between the top wall and the bottom wall. A peripheral edge of the diaphragm is recessed inward for avoiding the two magnetic units.

Further, each magnetic unit includes two magnets spaced apart from each other for forming the magnetic gap and two pole plates attached to two surfaces of the two magnets away from the magnetic gap respectively, the two magnets are sandwiched between the top wall and the bottom wall.

Further, the side wall is provided with two notches, one pole plate of each magnetic unit close to the side wall is accommodated in one corresponding notch.

Further, the vibrator assembly includes two elastic supporting members fixed to the side wall and located at two opposite ends of the vibrating unit for suspending the vibrating unit in the frame.

Further, the vibrator assembly includes a driving coil fixed to the bottom wall, the vibrating unit includes a weight and a magnetic system fixed to the weight, the magnetic system is opposite to and spaced apart from the driving coil.

Further, the vibrator assembly includes a stator fixed to the bottom wall, the vibrating unit includes a weight with a receiving space and a magnetic system received in the receiving space, the stator locates in the receiving space and is opposite to and spaced apart from the magnetic system, the stator includes a magnetic core and a coil wound on the magnetic core.

Further, the speaker assembly includes a skeleton for connecting the diaphragm and the two voice coils.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure.

DETAILED DESCRIPTION OF THE EMBODIMENTS

Figure 1:
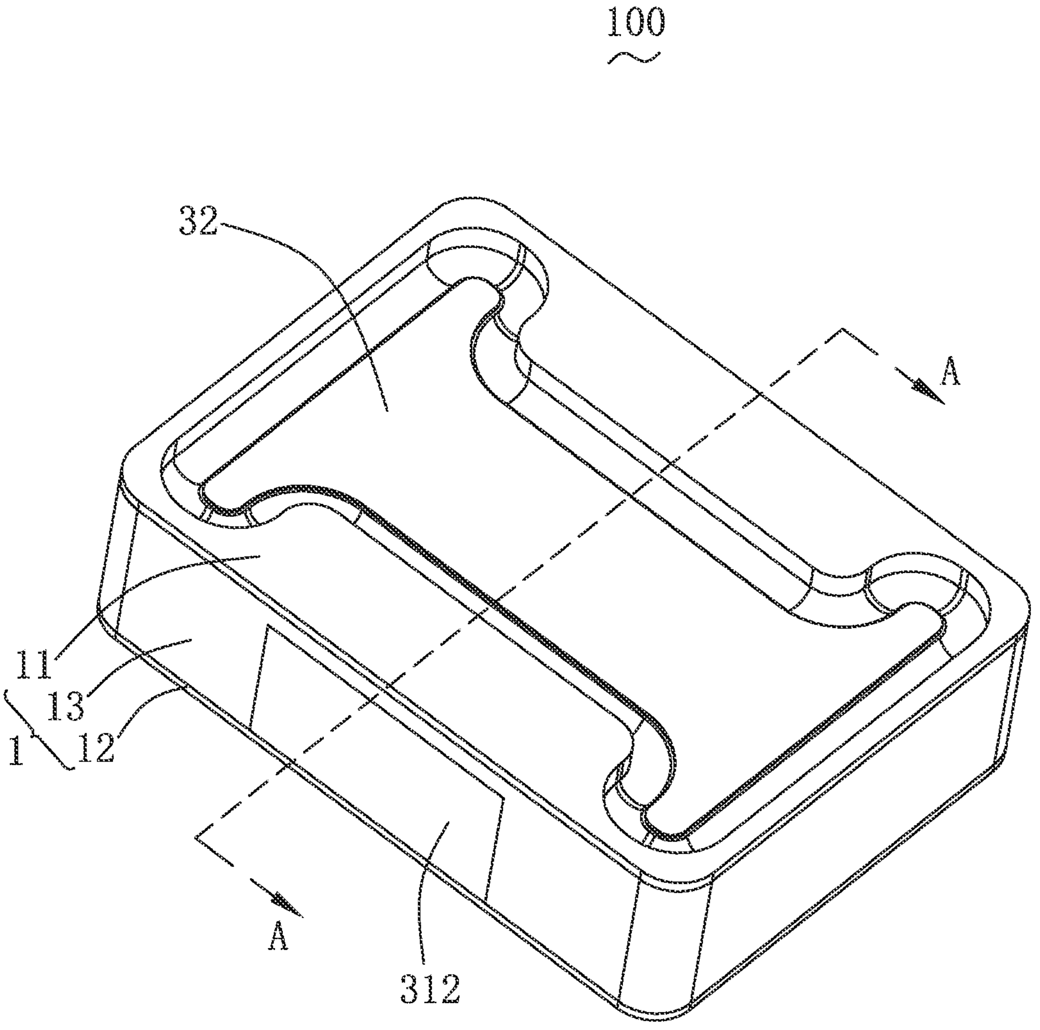
FIG. 1 is an isometric view of a multifunctional sounding device in accordance with an exemplary embodiment of the present disclosure.
Figure 2:
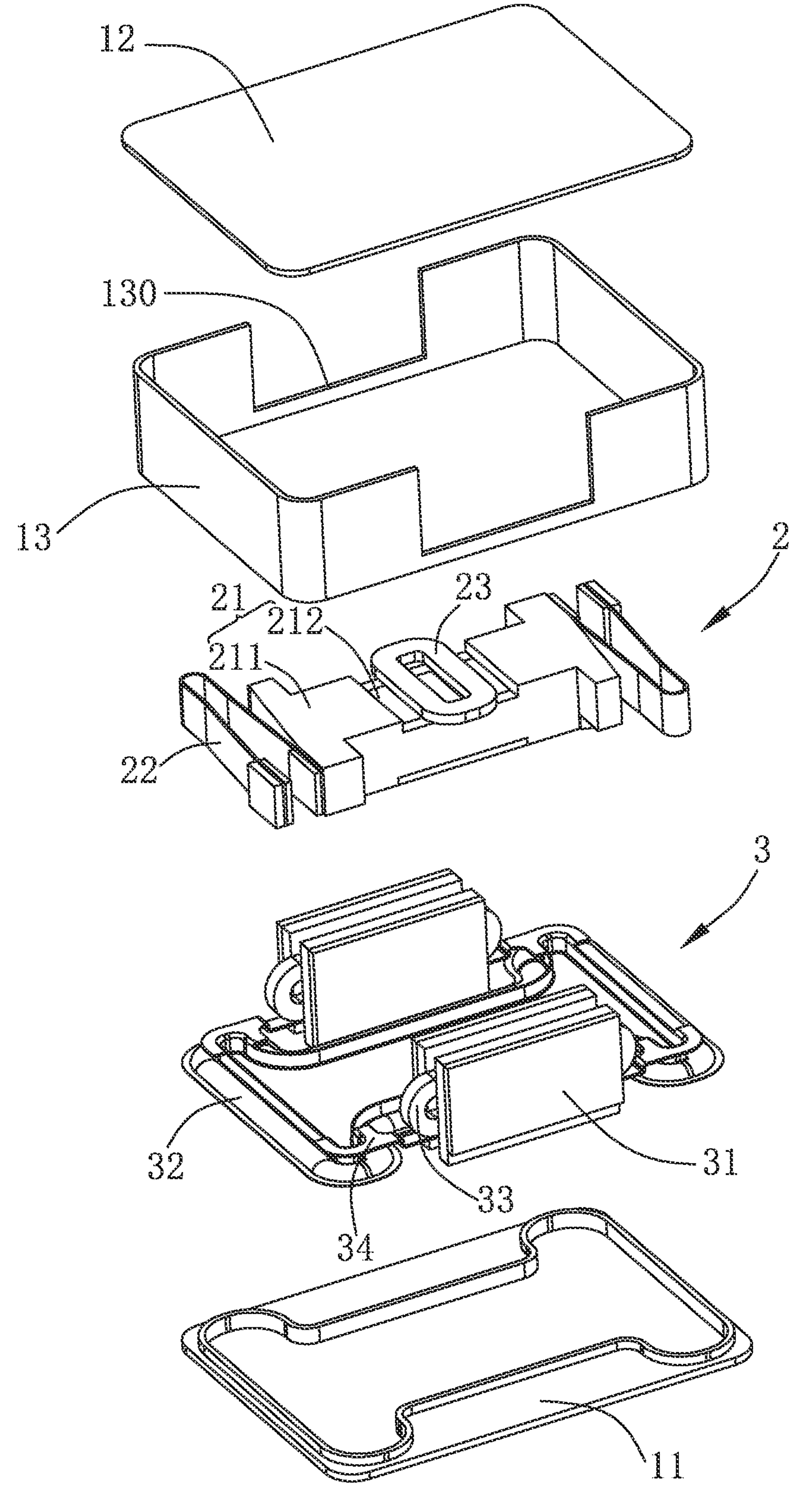
FIG. 2 is a partially exploded view of the multifunctional sounding device in FIG. 1.
Figure 3:
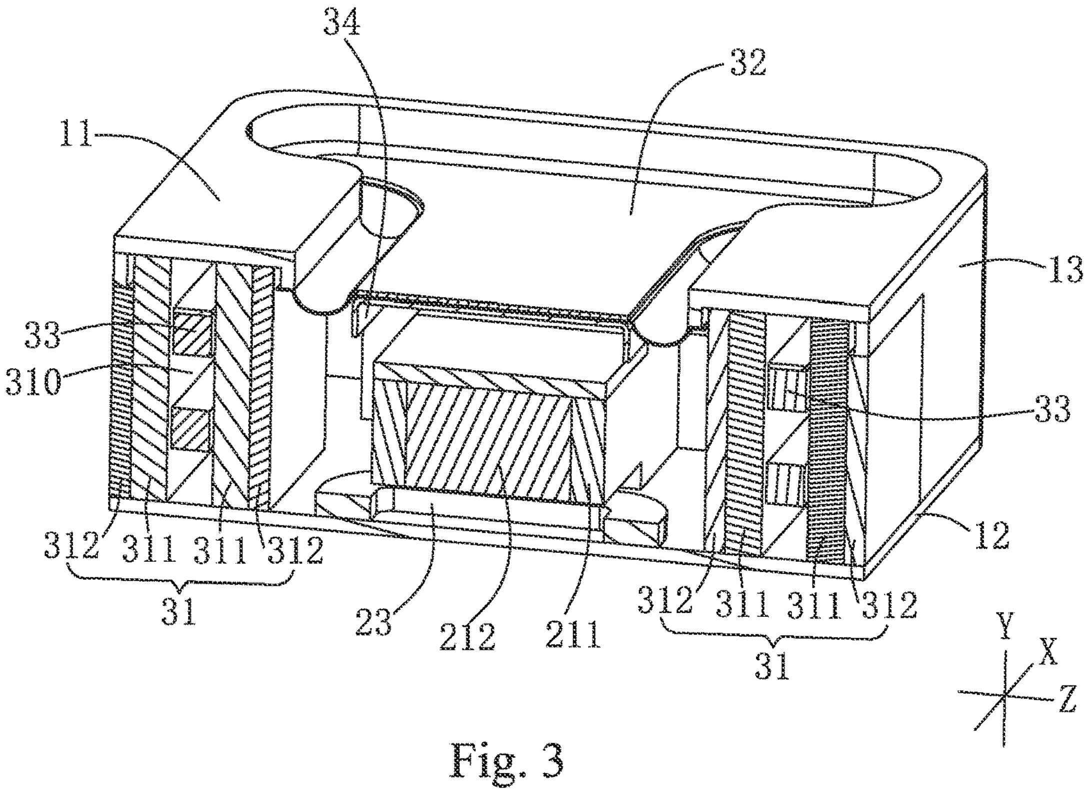
FIG. 3 is a cross-sectional view of the multifunctional sounding device, taken along line A-A in FIG. 1.
Figure 4:
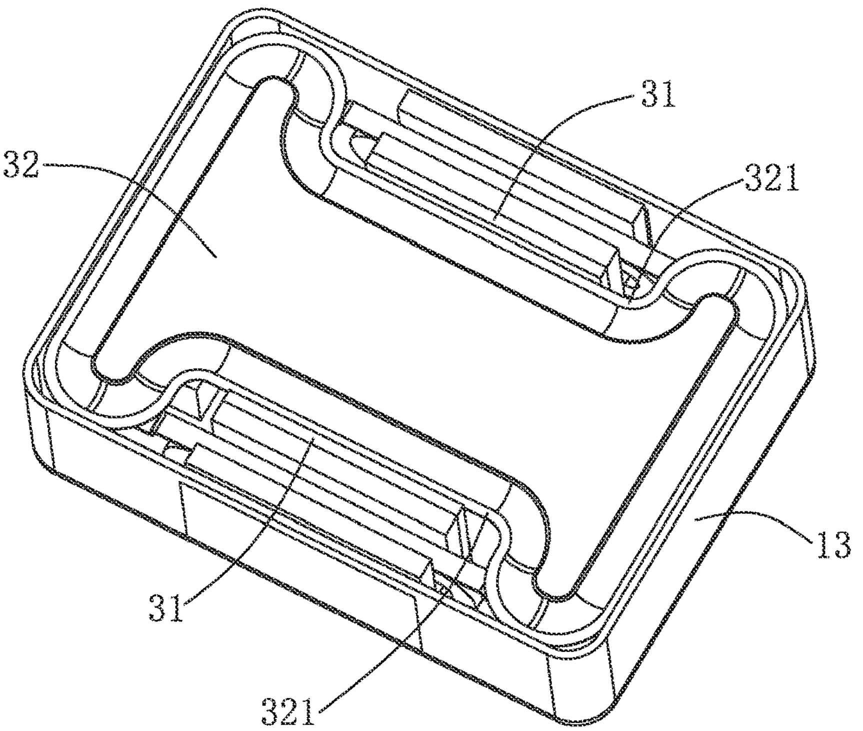
FIG. 4 is an isometric view of the multifunctional sounding device in FIG. 1, removing a top wall of a frame.
Figure 5:
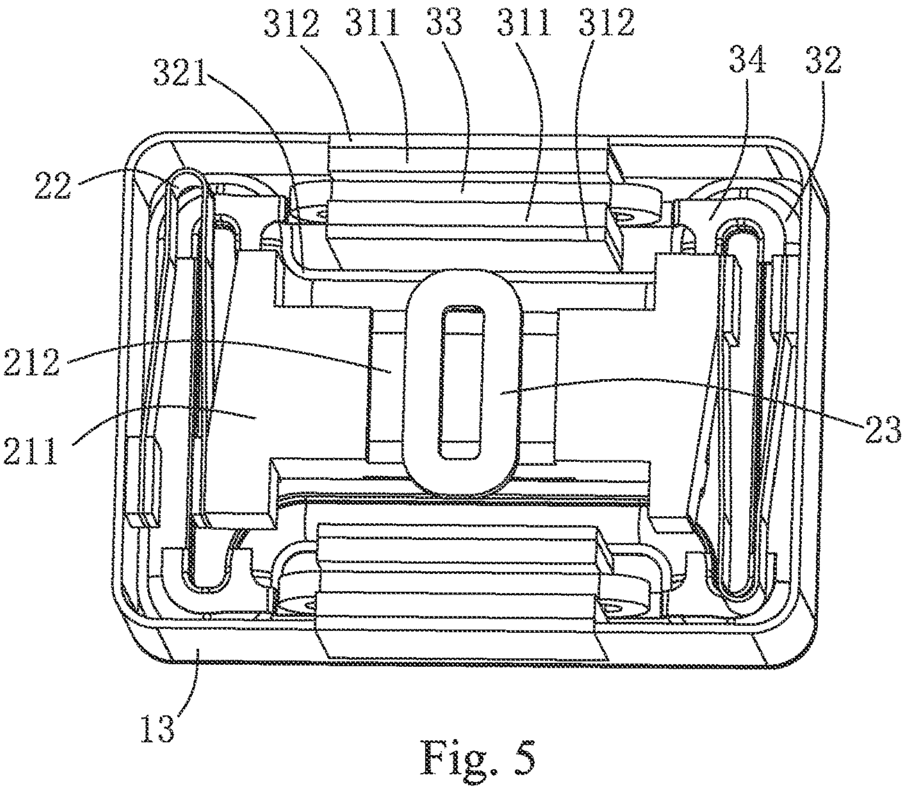
FIG. 5 is an isometric view of the multifunctional sounding device in FIG. 1, removing a bottom wall of a frame.

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Referring to FIGS. 1-5, the present disclosure discloses a multifunctional sounding device 100 including a frame 1, a vibrator assembly 2, and a speaker assembly 3. The vibrator assembly 2 and the speaker assembly 3 are accommodated in the frame 1. Optionally, the frame 1 includes a top wall 11, a bottom wall 12 opposite to and spaced apart from the top wall 11, and a side wall 13 connecting the top wall 11 and the bottom wall 12.

The vibrator assembly 2 includes a vibrating unit 21 suspended in the frame 1 and vibrating along a first direction X, two elastic supporting members 22 fixed to the side wall 13 and located at two opposite ends of the vibrating unit 21 for suspending the vibrating unit 21 in the frame 1, and a driving coil 23 fixed to the bottom wall 12. The vibrating unit 21 includes a weight 211 and a magnetic system 212 fixed to the weight 211. The magnetic system 212 is opposite to and spaced apart from the driving coil 23. In other embodiments, some other supporting forms may replace the elastic supporting members 22 as long as the vibrating unit 21 can be suspended and vibrate in the frame 1, such as guide rails or guide shafts.

The speaker assembly 3 includes two magnetic units 31 fixed to the frame 1 and located on two opposite sides of the vibrating unit 21 respectively, a diaphragm 32 fixed to the top wall 11 and vibrating along a second direction Y, and two voice coils 33 driving the diaphragm 32 for vibrating and generating sounds. The second direction Y is perpendicular to the first direction X. Each magnetic unit 31 includes a magnetic gap 310. The two voice coils 33 locate in the magnetic gaps 310 of the two magnetic units 31 respectively. A winding axis Z of each voice coil 33 is perpendicular to the first direction X and the second direction Y. The two magnetic units 31 are sandwiched between the top wall 11 and the bottom wall 12. A peripheral edge 321 of the diaphragm 32 is recessed inward for avoiding the two magnetic units 31. Optionally, each magnetic unit 31 includes two magnets 311 spaced apart from each other for forming the magnetic gap 310 and two pole plates 312 attached to two surfaces of the two magnets 311 away from the magnetic gap 310 respectively. The two magnets 311 are sandwiched between the top wall 11 and the bottom wall 12.

For optimizing structural layouts of the multifunctional sounding device 100 and facilitating installations and positionings of the two magnetic units 31, the side wall 13 is provided with two notches 130, one pole plate 312 of each magnetic unit 31 close to the side wall 13 is accommodated in one corresponding notch 130.

Optionally, the speaker assembly 3 further includes a skeleton 34 for connecting the diaphragm 32 and the two voice coils 33. The skeleton 34 can couple dispersed driving forces generated by the two voice coils 33 in two positions for driving the diaphragm 32 synchronously and making the diaphragm 32 vibrating in balance.

Figure 6:
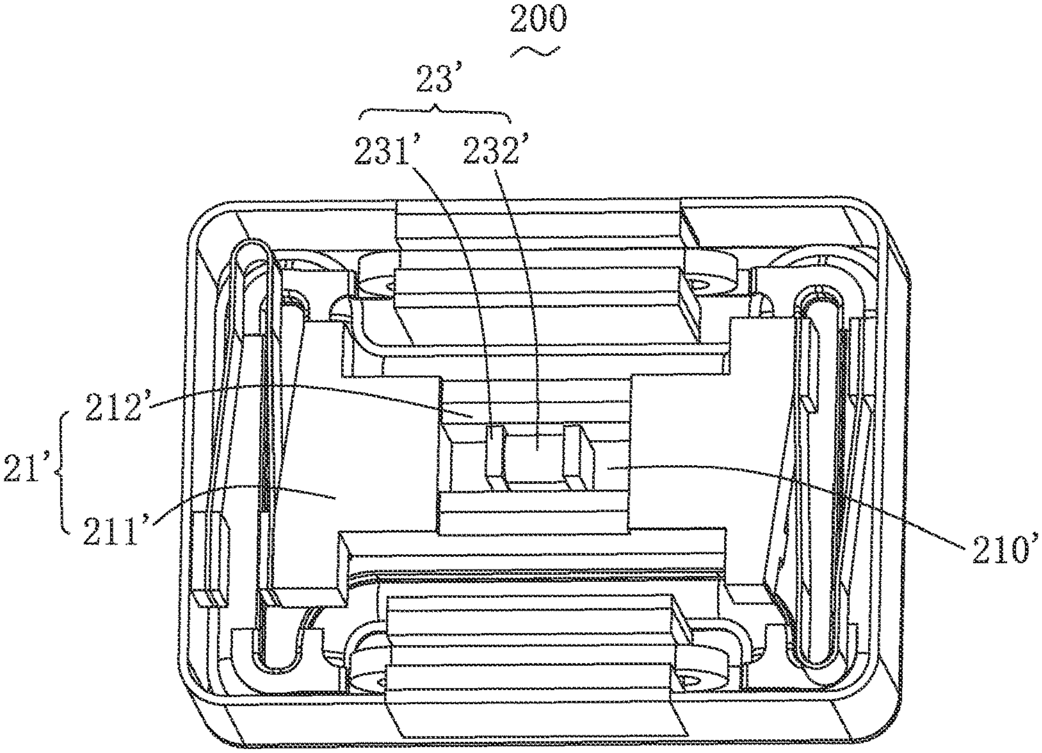
FIG. 6 is an isometric view of another multifunctional sounding device, removing part of a frame.

Referring to FIG. 6, another multifunctional sounding device 200 is disclosed. A difference between the multifunctional sounding device 200 and the aforementioned multifunctional sounding device 100 lies in driving forms of different vibrator assemblies, and the rest can refer to the aforementioned multifunctional sounding device 100. Different from a driving form of the driving coil 23 and the magnetic system 212 of the aforementioned multifunctional sounding device 100, a vibrator assembly of the multifunctional sounding device 200 includes a stator 23' fixed to a bottom wall (as the bottom wall 12 of the aforementioned multifunctional sounding device 100), and a vibrating unit 21' including a weight 211' with a receiving space 210' and a magnetic system 212' received in the receiving space 210'. The stator 23' locates in the receiving space 210' and is opposite to and spaced apart from the magnetic system 212'. The stator 23' includes a magnetic core 231' and a coil 232' wound on the magnetic core 231'.

Compared with the related art, the multifunctional sounding device 100/200 combines functions of emitting sounds and providing vibrations. When installing the multifunctional sounding device 100/200 into an electronic device, the multifunctional sounding device 100/200 simplifies separate installations of an individual speaker and an individual vibrator and occupies fewer interior spaces of the electronic device. In addition, since the peripheral edge 321 of the diaphragm 32 is recessed inward for avoiding the two magnetic units 31 and the two magnetic units 31 are sandwiched between the top wall 11 and the bottom wall 12, heights of the two magnetic units 31 are maximized for optimizing a driving force of the speaker assembly 3.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A multifunctional sounding device, comprising:

a frame, comprising a top wall, a bottom wall opposite to and spaced apart from the top wall, and a side wall connecting the top wall and the bottom wall;

a vibrator assembly accommodated in the frame, comprising a vibrating unit suspended in the frame and vibrating along a first direction; and a speaker assembly accommodated in the frame, comprising:

two magnetic units fixed to the frame and located on two opposite sides of the vibrating unit respectively, each magnetic unit comprising a magnetic gap;

a diaphragm fixed to the top wall and vibrating along a second direction, the second direction being perpendicular to the first direction; and two voice coils located in the magnetic gaps of the two magnetic units respectively and driving the diaphragm for vibrating and generating sounds, a winding axis of each voice coil being perpendicular to the first direction and the second direction;

wherein the two magnetic units are sandwiched between the top wall and the bottom wall, a peripheral edge of the diaphragm is recessed inward for avoiding the two magnetic units.

2. The multifunctional sounding device as described in claim 1, wherein each magnetic unit comprises two magnets spaced apart from each other for forming the magnetic gap and two pole plates attached to two surfaces of the two magnets away from the magnetic gap respectively, the two magnets are sandwiched between the top wall and the bottom wall.

3. The multifunctional sounding device as described in claim 2, wherein the side wall is provided with two notches, one pole plate of each magnetic unit close to the side wall is accommodated in one corresponding notch.

4. The multifunctional sounding device as described in claim 1, wherein the vibrator assembly further comprises two elastic supporting members fixed to the side wall and located at two opposite ends of the vibrating unit for suspending the vibrating unit in the frame.

5. The multifunctional sounding device as described in claim 1, wherein the vibrator assembly further comprises a driving coil fixed to the bottom wall, the vibrating unit comprises a weight and a magnetic system fixed to the weight, the magnetic system is opposite to and spaced apart from the driving coil.

6. The multifunctional sounding device as described in claim 1, wherein the vibrator assembly further comprises a stator fixed to the bottom wall, the vibrating unit comprises a weight with a receiving space and a magnetic system received in the receiving space, the stator locates in the receiving space and is opposite to and spaced apart from the magnetic system, the stator comprises a magnetic core and a coil wound on the magnetic core.

7. The multifunctional sounding device as described in claim 1, wherein the speaker assembly further comprises a skeleton for connecting the diaphragm and the two voice coils.

* * * * *